US006682622B2

(12) United States Patent
Matarasso

(10) Patent No.: US 6,682,622 B2
(45) Date of Patent: Jan. 27, 2004

(54) CELLULAR CUSHIONING MATERIAL AND A METHOD FOR ITS PRODUCTION

(75) Inventor: Hasdi Matarasso, Netanya (IL)

(73) Assignees: Roni-Pal Ltd., South Netanya (IL); Nova-Tek Technologies, Ltd., Netanya (IL)

( * ) Notice: Subject to any disclaimer, the term of this patent is extended or adjusted under 35 U.S.C. 154(b) by 112 days.

(21) Appl. No.: 09/758,544

(22) Filed: Jan. 12, 2001

(65) Prior Publication Data

US 2002/0094393 A1 Jul. 18, 2002

(51) Int. Cl.[7] ........ B32B 31/04

(52) U.S. Cl. ........ 156/145; 156/147; 156/292; 53/403

(58) Field of Search ........ 156/145, 156, 156/147, 292; 53/403, 79

(56) References Cited

U.S. PATENT DOCUMENTS

| | | | | |
|---|---|---|---|---|
| 3,575,757 A | | 4/1971 | Smith | |
| 3,713,930 A | | 1/1973 | Levrini et al. | |
| 3,868,285 A | * | 2/1975 | Troy | 156/147 |
| 3,900,356 A | * | 8/1975 | Koch et al. | 156/145 |
| 4,096,306 A | | 6/1978 | Larson | |
| 6,423,166 B1 | * | 7/2002 | Simhaee | 156/156 |

* cited by examiner

*Primary Examiner*—Michael W. Ball
*Assistant Examiner*—Todd J. Kilkenny
(74) *Attorney, Agent, or Firm*—Lowe Hauptman Gilman & Berner LLP

(57) ABSTRACT

Cellular cushioning material and a method for its production is described. In one scenario, the method includes providing a pre-welded sheet to a user comprised of at least two layers of plastic pre-welded to have a plurality of diagonally oriented, inflatable sleeves extending substantially the entire width of said sheet, and a longitudinally extending air entry passage. Each of the inflatable sleeves has an opening for allowing entry of air from said air entry passage into said sleeve. The user inflates the cellular cushioning material on an as-needed, real-time basis.

19 Claims, 5 Drawing Sheets

CELLULAR CUSHIONING MATERIAL AND A METHOD FOR ITS PRODUCTION

FIELD OF THE INVENTION

The present invention relates to the field of cellular cushioning material. More specifically, the present invention relates to cellular cushioning material and to a method for the production thereof on as-needed, real-time basis.

BACKGROUND OF THE INVENTION

Packaging material is used in many different industries for securing the safe storage and transportation of a variety of goods. However, because of its function as both an insulator and shock-absorber, packaging material is usually extremely bulky, leading to high storage and transportation costs, as well as inconvenience. Cellular cushioning, a type of packaging material having air-filled pockets, is marketed and sold with the pockets already inflated and sealed shut. While providing a high degree of shock-absorbancy and protection, cellular cushioning presents a huge inconvenience both to its manufacturers and to users due to its bulkiness and due to the hassle involved in its transport and storage. A more convenient and user-friendly cellular cushioning material would prove to be of great advantage to modern industry.

U.S. Pat. No 4,096,306 to Larson describes a strip material that may be inflated and sealed at the site of the intended use to form cushioning material. The strip material comprises two heat sealable films which are fused together in discrete areas to form two rows of inflatable chambers along the strip and a passageway extending the length of the strip material between the rows. Each chamber has an inlet opening communicating with the passageway. The strip material is inflated by propelling the passageway in the strip over an air nozzle to inflate the chambers through their inlet openings, and the inlets are then sealed. Two preferred embodiments of the invention of U.S. Pat No. 4,096,306 are shown in FIGS. 8 and 9, to be further described.

While the above-mentioned offers certain advantages over other prior art, the present invention offers users a convenient and reliable method for the production of packaging material according to the real-time, specific needs of the user. The invention described in U.S. Pat. No. 4,096,306 does not allow the user to alter the cushioning material in any way, while the present invention enables the user to determine, among other things, the size of the individual cells of the cushioning material, the length of the packaging material, as well as other features, as to be described and appreciated further.

SUMMARY OF THE INVENTION

It is therefore the primary object of the present invention to provide a novel method for the production of cellular cushioning material that is both hassle-free and highly convenient. According to the method of the present invention, a user is provided with non-inflated packaging material. The non-inflated packaging material has a unique design that allows for simple and straightforward inflation of a desired length of the material by the user. The user inflates the material on an as-needed, real-time basis. This method is in sharp contrast to other methods known in the art, wherein the cellular cushioning material is sold to users with the cells already inflated. In the present invention, the ability of the user to complete formation of the material himself eliminates the need for large storage space typically required. It furthermore allows for production of a specific size or length of cellular cushioning in a neat and orderly manner. Because it is only inflated by the end user, the cushioning material produced in the method of the present invention is convenient to store and distribute to users. For this reason it also has the potential to reduce costs significantly while providing cellular cushioning material that is stronger than those currently available.

The present invention relates to a method for the production of cellular cushioning material, comprising;

(a) providing a pre-welded sheet comprised of at least two layers of plastic pre-welded in a predetermined manner so as to have a plurality of diagonally oriented, inflatable sleeves extending substantially the entire width of said sheet, and a longitudinally extending air entry passage, wherein each of said inflatable sleeves has an opening for allowing entry of air from said air entry passage into said sleeve;

(b) injecting air into said sheet through said air passage;

(c) sealing a section of said sleeves so as to form a row of inflated cushioning cells;

(d) repeating step (c) until the desired number of rows of inflated cushioning cells is obtained.

While the pre-welded sheet preferably is comprised of two layers of plastic, it is appreciated that it may also be comprised of more than two layers, for providing, for example, more durable cushioning cells.

The longitudinally extending air entry passage is preferably located at one side of the sheet or in the center of the sheet, as to be further seen in the Figures. The openings in the inflatable sleeve lead to the air entry passage for allowing air passage therethrough during inflating of the sleeves.

In some preferred embodiments of the present invention, the method further comprises separating the rows of inflated cushioning cells from the remainder of the sheet. The user device employed for inflating and final sealing of the material may be adapted for performing a full cut in order to separate the inflated cushioning cells from the remainder of the material. Alternatively, the user device may be adapted for creating perforations in the cushioning material, such that manual separation of the cushions may be accomplished by separating along the perforations. In other embodiments, the user receives the pre-welded sheets already having perforations (made by the manufacturer), also enabling manual separation of the cushions by separating along the perforations.

In further preferred embodiments of the present invention, the method further comprises dispensing the pre-welded sheet from a dispensing roll.

The present invention further relates to the cellular cushioning material produced through the aforementioned method.

The present invention also relates to a method for the production of cellular cushioning material, comprising;

(a) providing a sheet having at least two layers of plastic;

(b) welding said at least two layers of plastic to one another in a predetermined manner so as to form a plurality of diagonally oriented, inflatable sleeves extending substantially the entire width of said sheet, and a longitudinally extending air entry passage, wherein each of said inflatable sleeves has an opening positioned for allowing entry of air from said air entry passage into said sleeve;

(c) injecting air into said sheet through said air entry passage;

(d) sealing a section of said sleeves so as to form a row of inflated cushioning cells;

(e) repeating step (d) until the desired number of rows of inflated cushioning cells is obtained;

The longitudinally extending air entry passage is preferably located at one side of the sheet or in the center of the sheet, as to be further seen in the Figures. The openings in the inflatable sleeve lead to the air entry passage for allowing air passage therethrough during inflating of the sleeves.

In some preferred embodiments of the present invention, the method further comprises separating the rows of inflated cushioning cells from the remainder of the sheet. The user device employed for inflating and final sealing of the material may be adapted for performing a full cut in order to separate the inflated cushioning cells from the remainder of the material. Alternatively, the user device may be adapted for creating perforations in the cushioning material, such that manual separation of the cushions may be accomplished by separating along the perforations.

In further preferred embodiments of the present invention, the method further comprises dispensing the pre-welded sheet from a dispensing roll.

The present invention further relates to the cellular cushioning material produced through the aforementioned method.

The present invention additionally relates to inflatable cellular cushioning material adapted to be inflated by a user on an as-needed, real-time basis, comprising at least two layers of plastic pre-welded to one another in a predetermined manner so as to form a sheet having a plurality of partially closed, diagonally oriented, inflatable sleeves extending substantially the entire width of said sheet, and a longitudinally extending air-injector passage, wherein each of said inflatable sleeves has an opening positioned for allowing passage of air from said air-injector passage into said sleeve. In some embodiments, at least at a portion of places where the plastic layers have been pre-welded to one another, there are perforations for enabling manual separation of the cellular cushioning material after it has been inflated. The diagonally oriented, inflatable sleeves may have straight edges, or may have edges having any type of desired curvature or contour.

BRIEF DESCRIPTION OF THE DRAWINGS

The present invention is herein described, by way of example only, with reference to the accompanying drawings, wherein.

DETAILED DESCRIPTION OF THE DRAWINGS

It is appreciated that the detailed description that follows is intended only to illustrate certain preferred embodiments of the present invention. It is in no way intended to limit the scope of the invention, as set out in the claims.

Figure 1C:
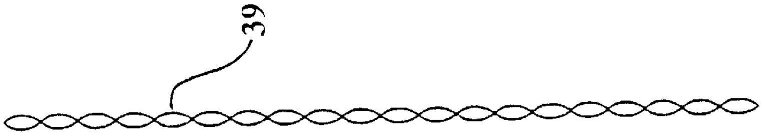
FIG. 1B and FIG. 1C illustrate a top view and a side view, respectively, of the cellular cushioning material of FIG. 1A, following inflation and final sealing by a user.
Figure 1B:
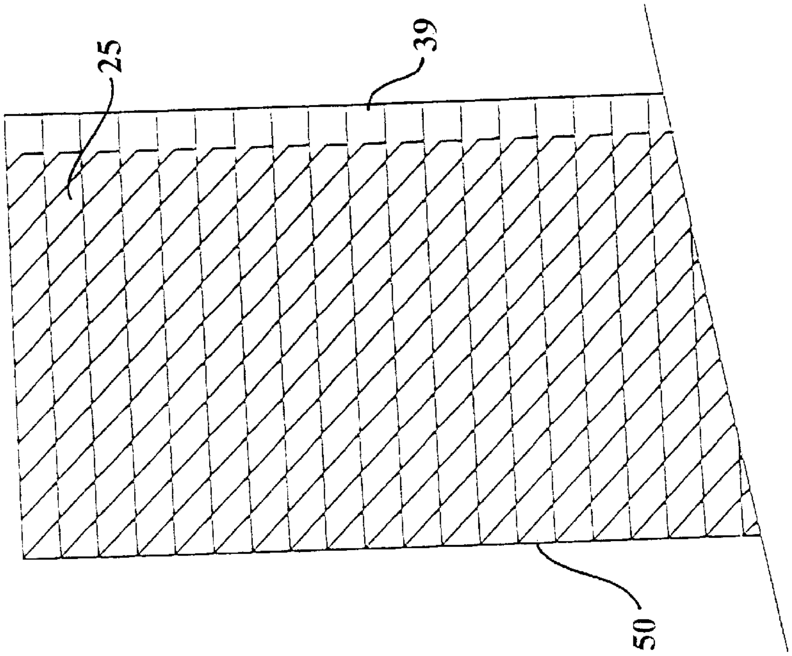
Figure 1A:
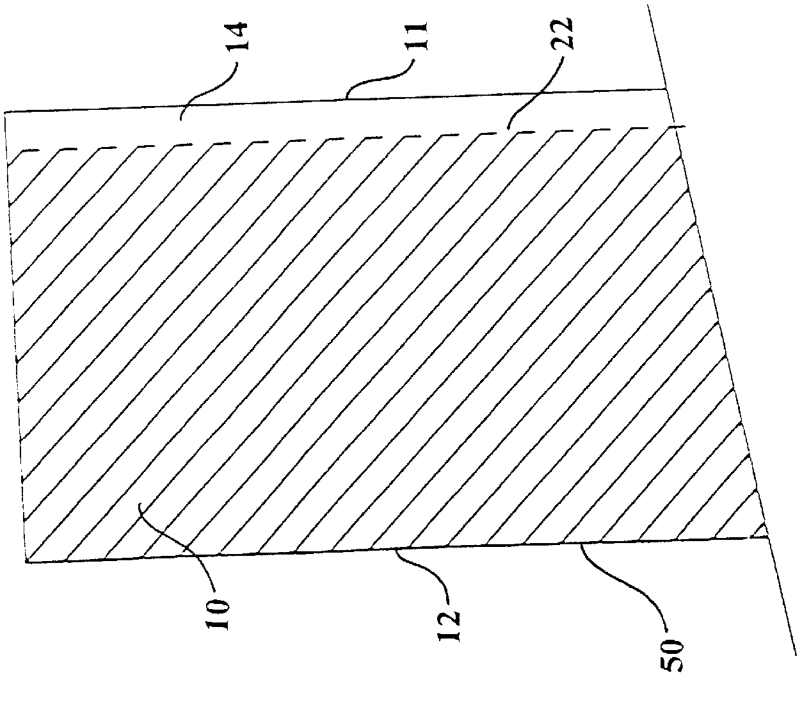
FIG. 1A illustrates a top view of non-inflated cellular cushioning material adapted to be inflated and completely sealed by a user, according to a preferred embodiment of the present invention.

Referring first to FIG. 1A, the cellular cushioning material of the present invention is comprised of a sheet 50 formed from at least two layers of plastic. The plastic layers are welded to one another on either longitudinal side 11 and 12. They are furthermore welded to one another in a diagonal manner across their widths, thereby forming a plurality of diagonally oriented sleeves 10. The diagonal sleeves 10 terminate downwardly before contacting side 11, thereby forming a longitudinally extending air entry passage 14. Each of the sleeves 10 is substantially sealed on all sides, except for a small opening 22 at the side of the sleeve facing the air entry passage 14 for allowing air from the air entry passage to enter the respective sleeve. In one preferred embodiment, the user receives the non-inflated cellular cushioning material already pre-welded. In another preferred embodiment, the user receives the layered sheet without the diagonal welding. In this embodiment, the user device is adapted for forming the diagonal welding in the sheet.

Referring to FIG. 1B, the cellular cushioning material is shown following inflating and final sealing (to be described in FIGS. 2–5). The cellular cushioning material contains a plurality of rows 39 of inflated cushioning cells 25. FIG. 1C shows a side view of the inflated rows 39. It will be appreciated through further description that the length of cellular cushioning material produced is determined by the user, according to the specific needs at the time of use.

Figure 2:
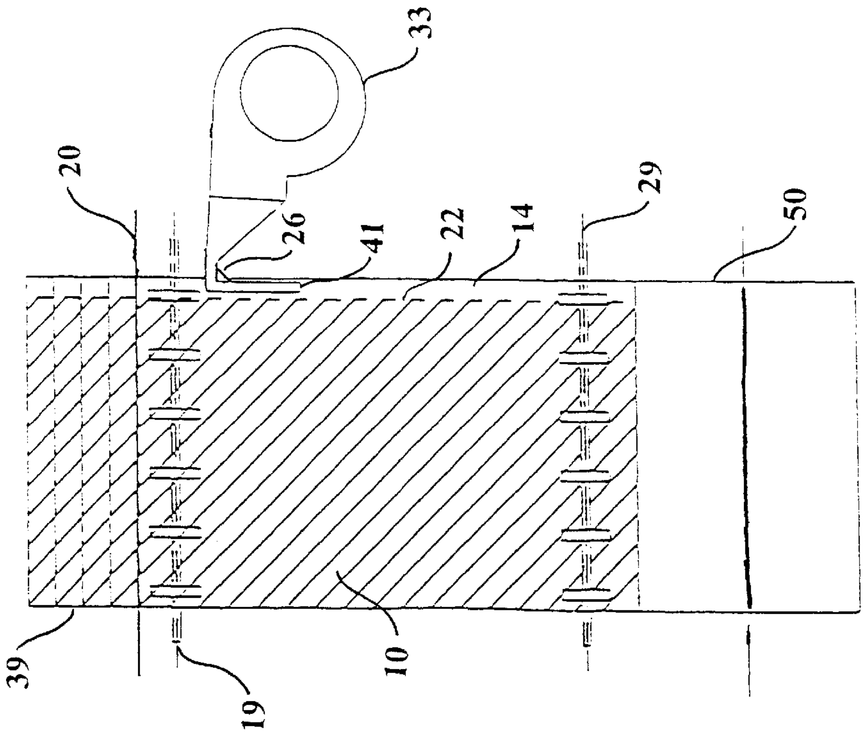
FIG. 2 illustrates a top view of cellular cushioning material according to a preferred embodiment of the present invention, as said material is being inflated and completely sealed with a user device.
Figure 5A:
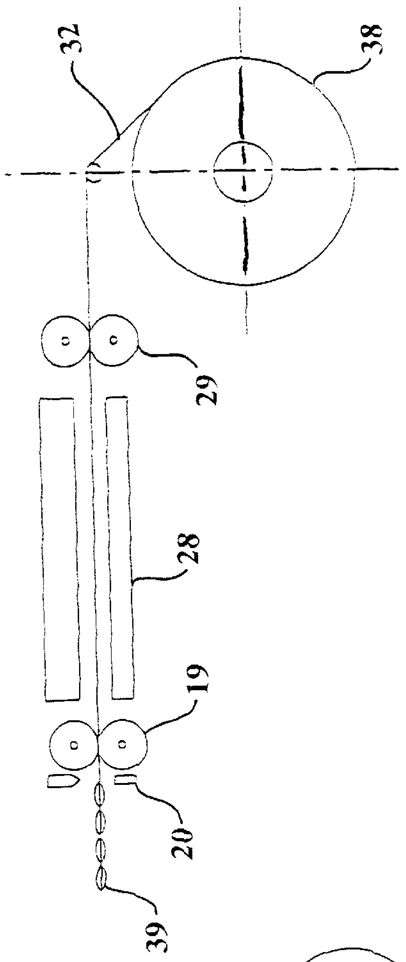
FIGS. 5A and 5B illustrate side views of the cushioning material of FIG. 4, as said material is being inflated and completely sealed with a user device, said user device being shown in two positions.
Figure 5B:
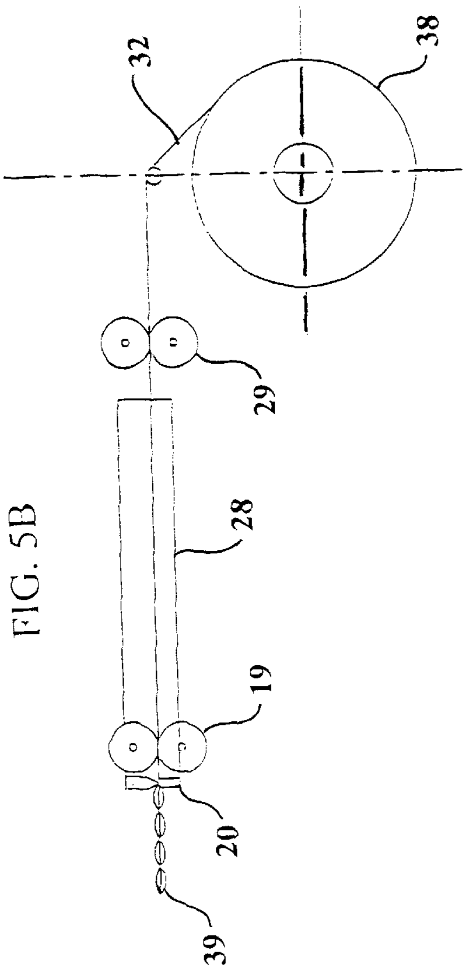

Referring to FIG. 2, in certain preferred embodiments of the present invention, the user receives a pre-welded sheet 50 having a plurality of diagonally oriented, inflatable sleeves 10. A desired length of pre-welded sheet 50 is inflated and completely sealed by the user with a user device adapted for performing these functions. Preferably, the user device comprises advancing means 19, 29 (front and back, respectively) for advancing the sheet, air injecting means for injecting air into the sheet, such as air blower 33, air inlet pipe 41, and knife 26, and sealing means, such as horizontal seal bars 20, for sealing a section of the sleeve (the seal bars do not need to necessarily be horizontal; horizontal seal bars 20 are meant for purposes of description and clarification only). In some models, the user device also comprises cutting means (not shown) for performing a full cut of the sheet after said sheet has been inflated and finally sealed. In other instances, the user may perform separation of the inflated cells via separations along perforations (said perforations being created by the user device or by the manufacturer of the cushioning material). Separation may be accomplished between rows of cushioning material, between diagonal sections of the cushioning material, and/or between individual cells of the cushioning material, depending on the needs of the user.

Figure 3A:
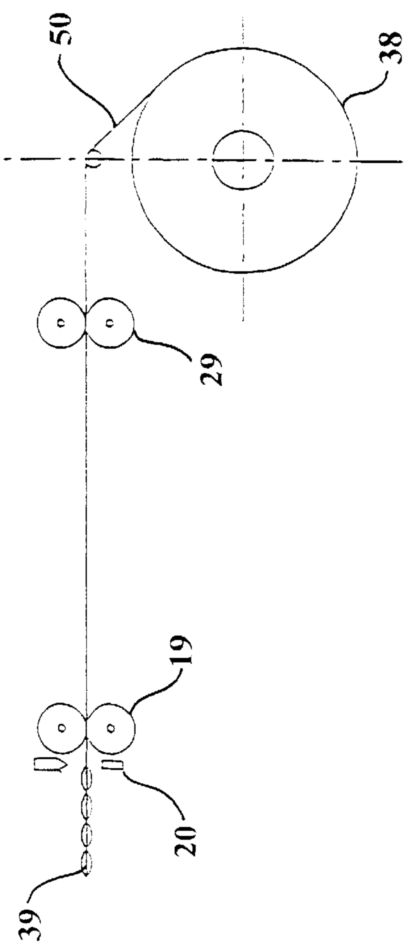
FIGS. 3A and 3B illustrate side views of the cushioning material of FIG. 2, as said material is being inflated and completely sealed with a user device, said user device being shown in two positions.
Figure 3B:
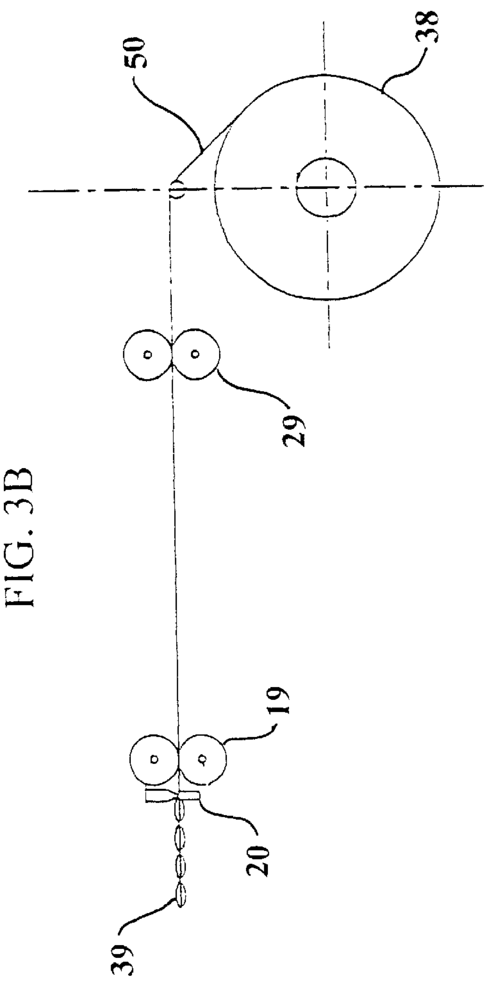

In certain preferred embodiments, the pre-welded sheet is dispensed from a dispensing roll, such as dispensing roll 38 shown in FIGS. 3A and 3B. It is appreciated that other means for convenient storage, transport, and dispensing of the material are also possible.

Referring now to FIGS. 2, 3A, and 3B in combination, a portion of pre-welded sheet 50 is advanced from dispensing roll 38, via advancing means 19, 29. The air inlet pipe 41 of air blower 33 is inserted, via knife 26, cut into the side of the sleeve containing the air entry passage 14. Air fills the diagonal sleeves 10, entering said sleeves via the small openings 22 located at the end of the sleeves 10. Once the necessary air pressure is achieved, the sheet is advanced a predetermined amount by the advancing means 19, 29. Said amount is determined by the user, according to the size of the individual cells that is desired. This size may vary, for example, according to the particular item being packaged or for the particular industry utilizing the cushioning material. Following this, the horizontal seal bars 20 seal a section of the air-filled sleeves so as to form a row 39 of inflated cushioning cells. In FIG. 3A, the horizontal seal bars 20 are shown in an open position while in FIG. 3B, said bars 20 are shown in a closed position, during sealing of a section. The sheet 50 may then be advanced again and another row formed however many times it is needed, so as to form cellular cushioning material of the desired length. In instances where relatively long lengths of cushioning material is needed, it may be necessary to repeat the entire process again (beginning from insertion of the air inlet pipe at a location further along the length of the sheet). Once the desired length has been achieved, the inflated rows are separated from the remainder of the sheet 50. In certain embodiments, perforations may be formed in the horizontal seal that facilitates said separation.

Figure 4:
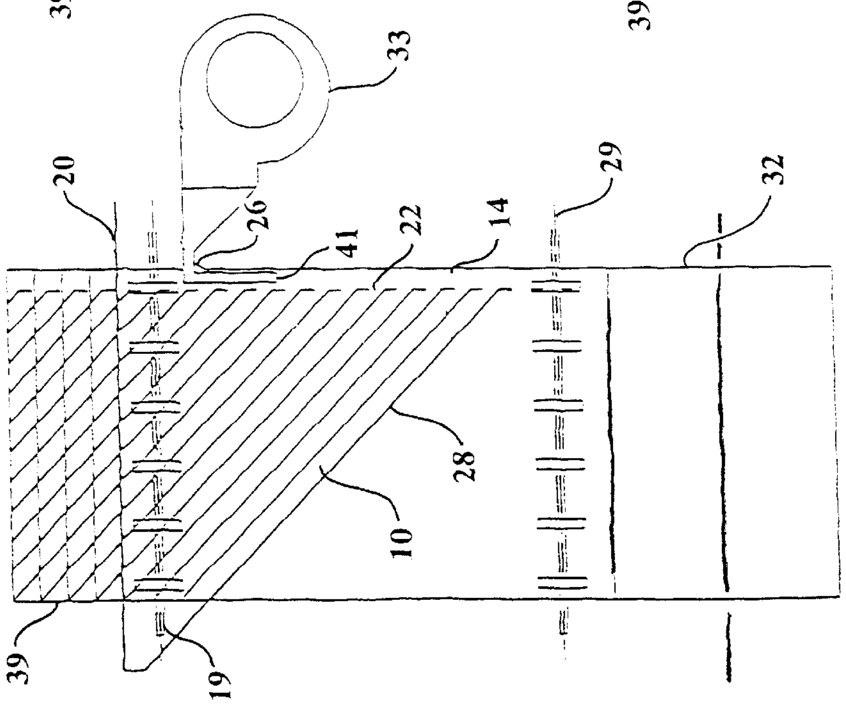
FIG. 4 illustrates a top view of cellular cushioning material according to another preferred embodiment of the present invention, as said material is being inflated and completely sealed with a user device.

Referring to FIG. 4, in other preferred embodiments of the present invention, the user receives a plastic sheet 32 having at least two layers, that, in contrast to sheet 50 of FIG. 2, is not pre-welded. The sheet 32 is preferably dispensed from a dispensing roll 38, shown in FIGS. 5A and 5B (similar to that of FIGS. 3A and 3B). The user device is substantially similar to that described in FIGS. 2, 3A, and 3B, only the user device employed for inflating and completely sealing the cellular cushioning material is, in this case, also adapted for welding the layers together to form the plurality of diagonal sleeves 10. It will be appreciated that this allows for greater control over the exact size of the cells of the cushioning material than that is afforded by using pre-welded sheets.

The method for forming cellular cushioning material is the same as the method described above (in FIGS. 2, 3A, and 3B), except that, before filling the sheet with air, angular seal bars 28 are employed for forming diagonal sleeves 10. The diagonal sleeves are formed one after the next, as sheet 32 is advanced via the advancing means 19, 29. Formation of new sleeves 10 may continue even as the air is being injected and sections of already air-filled sleeves are being sealed. The angular seal bars 28 are shown in an open position in FIG. 5A and in a closed position (during formation of the diagonal welding) in FIG. 5B.

The individual cushioning cells, when inflated, may assume the shape of a rhombus, diamond, or any other parallelogram. Alternatively, one or more sides of the cushioning cell may be curved, since the angular seal bars need not be straight, but may assume any shape, for example, an arc. The shape of the angular seal bars determines the final shape of the cushioning cells. Thus, a large variety of shapes of cushioning cells are possible. Furthermore, the angle of the angular seal bars 28 may vary, so as to provide cells having different dimensions. In some embodiments, the user can alter the angle of seal formed by the angular seal bars.

In the embodiments illustrated, horizontal seal bars 20 are used for sealing substantially horizontal sections, thereby forming substantially horizontal rows of cushioning material. It is appeciated however, that the seal bars need not be completely horizontal, but may assume any appropriate angle relative to the sides of the cushioning material. In some cases, the user may himself determine the angle of the seal bars with respect to the cushioning material, so as to form rows and individual cells of cushioning material having a variety of shapes and orientations.

Figure 7A:
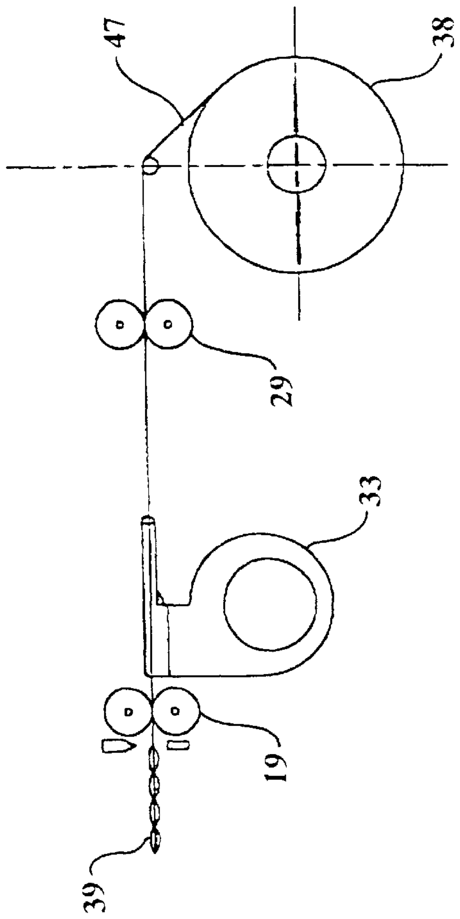
FIGS. 7A and 7B illustrate side views of the cushioning material of FIG. 6, as said material is being inflated and completely sealed with a user device, said user device being shown in two positions.
Figure 7B:
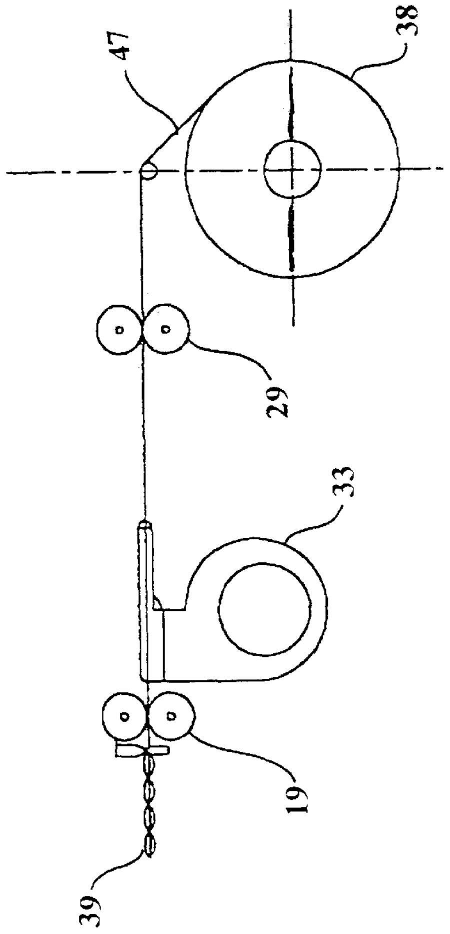
Figure 6:
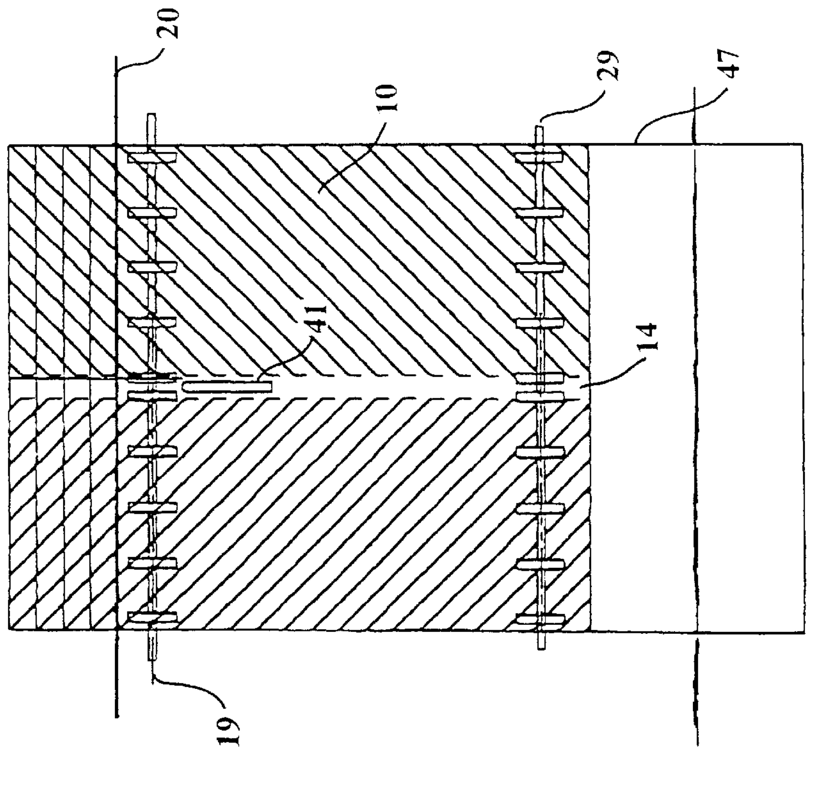
FIG. 6 illustrates a top view of cellular cushioning material according to yet another preferred embodiment of the present invention, as said material is being inflated and completely sealed with a user device.

Referring to FIGS. 6, 7A, and 7B, in certain preferred embodiments of the present invention, the user receives a pre-welded sheet 32 having a plurality of diagonally oriented, inflatable sleeves 10. In contrast to the embodiments shown in FIGS. 2 and 4, in the preferred embodiment of FIG. 6, the air entry passage 14 is located in the middle of the sheet, and a plurality of diagonally oriented, inflatable sleeves, exist on either side of the air entry passage, said sleeves having openings leading to the air entry passage. The air inlet pipe 41 of air blower 33 (seen in FIGS. 7A and 7B) is inserted into the middle of the sleeve where the air entry passage is located. In other aspects, this embodiment is substantially similar to the embodiment of FIGS. 2, 3A, and 3B.

It will be appreciated that the method of the present invention offers many advantages over the prior art. Due to the unique diagonal design of the welding (which may be pre-welded or welded by the user), row of cells are produced in a sequential manner, one after the next, via a single pair of seal bars. Each time a seal is formed, an entire row of cells is caused to be inflated, due to the increase in air pressure in each cell. This also allows for formation of uniform rows of cells, each cell having the exact same dimensions, and the rows being completely symmetric with respect to one another. Since the cells are not welded individually, this also allows for rapid and efficient formation of the desired length of cushioning material. A variety of types of plastics may be employed.

Further advantages include the ability for the user to vary the length of the cushioning material produced, and to vary the dimensions of the cells themselves by altering the amount that the sheet is advanced before each horizontal seal is formed. In embodiments where the non-prewelded sheet is used, the user may exercise further control over the size of each cell by varying the angle of the angular seal and the distance between each angular seal.

The sheets may be manufactured in a variety of different widths. After being inflated and sealed, the row of cells cover the entire area of the cushioning material. A single air-injecting source is all that is needed to provide air for inflating the cushioning material.

In methods of the prior art for producing cellular cushioning material, the sleeves are completely horizontal or vertical, and thus each sleeve needs to be inflated individually. In the present invention, the novel use of diagonal sleeves enables simultaneous inflating of all of the sleeves that have been dispensed from the dispensing roll. This enables for production of cushioning material at a much faster rate than previously possible.

Figure 8:
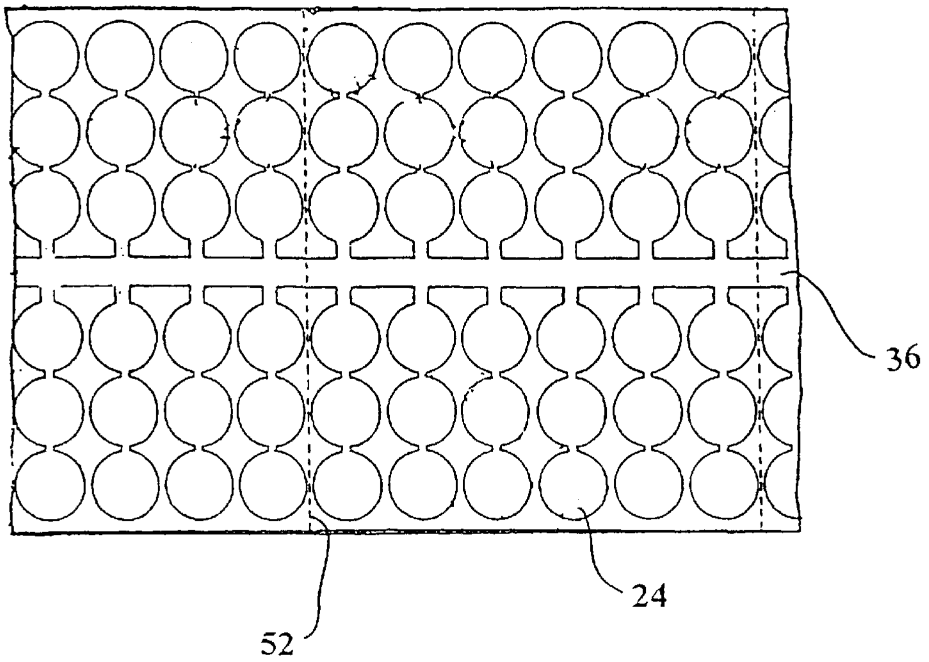
FIG. 8 (PRIOR ART)
FIGS. 8 and 9 shows a plan views of cushioning material of the prior art.
Figure 9:
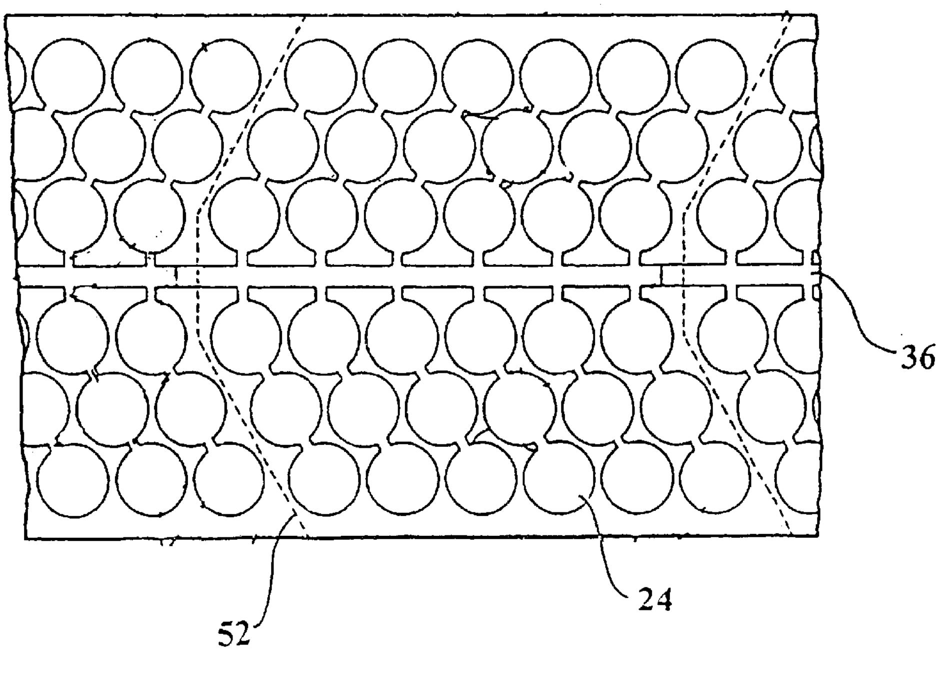
FIG. 9 (PRIOR ART)

FIGS. 8 and 9 represent cushioning material of U.S. Pat. No. 4,096,306. The material is comprised of rows of inflatable, circular, cells 24, each row having 3 cells. In said cushioning material, there is a maximum of 3 cells in each row on either side of an air passageway 36. Perforations 52 exist at predetermined points along the length of the material. The material is also adapted to be inflated by an end-user as needed. In contrast to the present invention, the prior art material is limited in width, allowing only 3 cells on either side of the air passageway. The present invention allows for more variable widths, because of the unique design of the diagonal sleeves. Moreover, since the perforations 52 are located only at predetermined locations between the rows of cells, the user cannot separate between individual cells nor can an individual row of cells be separated (since the cells are still connected to one another following inflating, it is impossible to separate one cell or row from the next without causing deflating). Thus, the length of the material can be determined only by the pre-existing perforations in the material. Furthermore, in contrast to the present invention, the size of each row and the size and shape of each cell cannot be altered. In the method of the present invention, the size and shape of each cell, and the size of each row, may be determined by the user. In U.S. Pat. No. 4,096,306, each horizontal or diagonally-oriented row (shown in FIGS. 8 and 9, respectively), needs to be inflated separately. Following inflating, said rows cannot be separated from one another (except along the perforations). Moreover, if one cell in a row becomes punctured and deflated, then all the cells become deflated as well.

What is claimed is:

1. A method of producing cellular cushioning material, said method comprising the steps of:

(a) providing a pre-welded sheet comprising at least two layers of plastic pre-welded in a predetermined manner so as to have a plurality of diagonally oriented, inflatable sleeves extending substantially an entire width of said sheet, and a longitudinally extending air entry passage, wherein each of said inflatable sleeves has an opening at one end thereof for allowing entry of air from said air entry passage into said sleeve;

(b) injecting air into said sheet through said air passage;

(c) sealing a section of said sleeves along a sealing line that extends in a direction intersecting the sleeves and the air entry passage so as to form a row of inflated, cushioning cells; and (d) repeating step (c) until a desired number of rows of inflated cushioning cells is obtained.

2. A method according to claim 1, wherein the longitudinally extending air entry passage is located in a central region of said sheet.

3. A method according to claim 1, wherein the longitudinally extending air entry passage is located at one side of said sheet.

4. A method according to claim 1, wherein the section sealed in step (c) extends, transversely of said sheet, the entire width of said sheet.

5. A method according to claim 1, wherein the section sealed in step (c) extends, at an angle relative to a side of said sheet, the entire width of said sheet.

6. A method according to claim 1, further comprising separating the rows of inflated cushioning cells from a remainder of the sheet.

7. A method according to claim 1, further comprising dispensing the pre-welded sheet from a dispensing roll.

8. A method of producing cellular cushioning material, said method comprising the steps of:

(a) providing a sheet having at least two layers of plastic;

(b) welding said layers of plastic to one another in a predetermined manner so as to form a plurality of diagonally oriented, inflatable sleeves extending substantially an entire width of said sheet, and a longitudinally extending air entry passage, wherein each of said inflatable sleeves has an opening for allowing entry of air from said air entry passage into said sleeve;

(c) injecting air into said sheet through said air entry passage;

(d) sealing a section of said sleeves along a sealing line that extends in a direction intersecting the sleeves and the air entry passage so as to form a row of inflated, cushioning cells; and (e) repeating step (d) until a desired number of rows of inflated cushioning cells is obtained.

9. A method according to claim 8, wherein the longitudinally extending air entry passage is located in a central region of said sheet.

10. A method according to claim 8, wherein the longitudinally extending air entry passage is located at one side of said sheet.

11. A method according to claim 8, wherein the section sealed in step (d) extends, transversely of said sheet, the entire width of said sheet.

12. A method according to claim 8, wherein the section sealed in step (d) extends, at an angle relative to a side of said sheet, the entire width of said sheet.

13. A method according to claim 8, further comprising separating said rows of inflated cushioning cells from a remainder of the sheet.

14. A method according to claim 8, further comprising dispensing the sheet from a dispensing roll.

15. A method according to claim 8, further comprising the step of forming perforations along welding lines where the plastic layers have been welded to one another in step (b), for enabling separation of the cellular cushioning material after step (e).

16. A method according to claim 8, wherein the diagonally oriented, inflatable sleeves have straight edges.

17. A method according to claim 8, wherein the diagonally oriented, inflatable sleeves have edges of a curvature.

18. A method of producing cellular cushioning material, said method comprising the steps of:

providing a sheet comprising at least two layers of plastic welded in a predetermined manner so as to have a plurality of inflatable sleeves extending in a first direction and an air entry passage, wherein each of said inflatable sleeves communicates with the air entry passage for allowing entry of air from said air entry passage into said sleeve;

feeding said sheet in a second direction intersecting the first direction;

injecting air into said sleeves through said air entry passage;

bonding the layers of said sheet together along a sealing line that extends in a third direction intersecting the first and second directions; and repeating said bonding until a desired number of rows of sealed, inflated cushioning cells is obtained;

wherein the air entry passage is elongated in a longitudinal direction of said sheet and said feeding comprises feeding said sheet in said longitudinal direction; and said sealing line extends an entire width of said sheet.

19. A method of producing cellular cushioning material, said method comprising the steps of:

providing a sheet comprising at least two layers of plastic welded in a predetermined manner so as to have a plurality of inflatable sleeves extending in a first direction and an air entry passage, wherein each of said inflatable sleeves communicates with the air entry passage for allowing entry of air from said air entry passage into said sleeve;

feeding said sheet in a second direction intersecting the first direction;

injecting air into said sleeves through said air entry passage;

bonding the layers of said sheet together along a sealing line that extends in a third direction intersecting the first and second directions; and repeating said bonding until a desired number of rows of sealed, inflated cushioning cells is obtained;

wherein said sealing line extends into said air entry passage.

* * * * *